March 6, 1945.   W. T. HANKE   2,370,860
UTENSIL HANDLE
Filed June 21, 1944
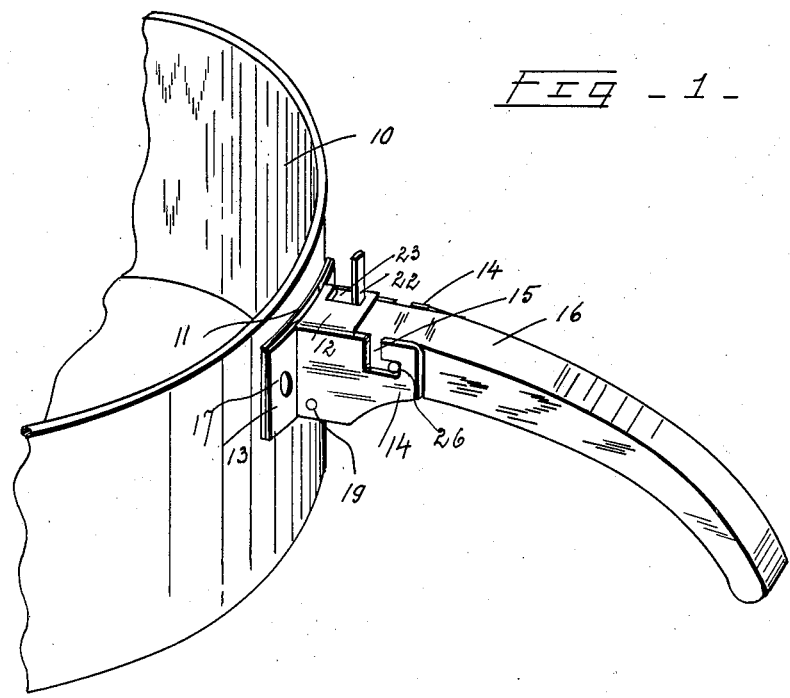
Fig. 1.
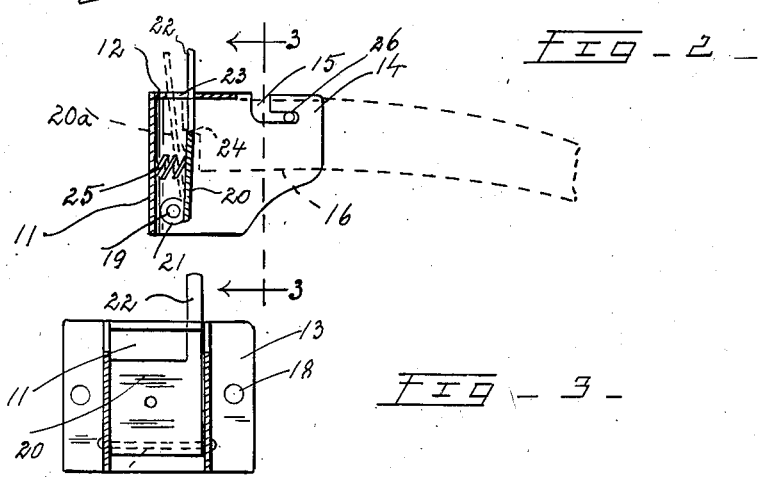
Fig. 2.
Fig. 3.
INVENTOR.
William T. Hanke.
BY
Louis Chayka
Attorney Patented Mar. 6, 1945

2,370,860

UNITED STATES PATENT OFFICE 2,370,860

UTENSIL HANDLE

William T. Hanke, Detroit, Mich.

Application June 21, 1944, Serial No. 541,362

2 Claims. (Cl. 16—114)

The purpose of my invention is to provide a practical handle for cooking utensils of the kind that may be easily and quickly attached to the respective utensils or separated therefrom when desired.

Detachable handles are already known in trade and their advantages are well appreciated. Specifically, the object of my invention is to provide a handle which is simple in construction, but positive in action, which, once inserted into a suitable receptacle on a respective utensil, will not wobble or slip out but which may be quickly and easily removed when this is desired.

I shall now describe my handle with reference to the accompanying drawing, in which:

Fig. 1 is a perspective view of my handle with a fragmentary perspective view of a utensil to which my handle is applied.

Fig. 2 is a vertical sectional view of a socket member for the reception of my handle.

Fig. 3 is a sectional view of said socket on line 3—3 of Fig. 2.

Similar numerals refer to similar parts throughout the several views.

The socket, which is adapted to receive the handle, is shown attached to the side of a utensil 10, and consists of a base plate 11 abutting the side of said utensil and a member which in cross-section forms an inverted letter U, said member having two side arms 14, spaced from each other, provided with slots 15 and a cross bridge 12. Laterally extending therefrom, are wings 13 abutting said base plate 11. Numeral 17 indicates bolts by means of which the socket is affixed to the side of utensil 10.

Disposed within the socket is a plate 20 pivoted on pin 19 by means of a hinge 21. Said plate 20 is spaced from base plate 11 and is kept away from said base plate by means of a coiled spring 25. Extending upwardly from plate 20 and passing through a slot 23 in bridge 12, is an integrally formed lever 22. The lever serves as a means to swing plate 20 inwardly to a position shown in dotted lines 20a against tension of spring 25.

The handle which goes into the socket is shown by numeral 16. The end which is intended to fit into the socket is cut off squarely, except that it has a shoulder 24 normally coming into abutment with the upper end of plate 20. On each side the handle contains a pin 26, which fits into said slot 15.

Both in Figs. 1 and 2 the handle is shown inserted into the socket. Assuming that it is intended to remove the handle from the socket, all that is necessary is to push lever 22 towards base plate 11, to swing plate 20 against the tension of spring 25 from under the shoulder 24, so that said plate 20 assumes position indicated by dotted lines 20a. When said plate is in this position, the handle may be swung upwardly on pins 26 serving as pivots, as said plate 20 is no more in the way of shoulder 24. The handle may now be slid forwardly towards base plate 11 so that pin 26 may be removed from slot 15.

When it is intended to insert the handle into the socket, the handle is held in a substantially perpendicular position with its operative head down, the pin is inserted into slot 15 and then the handle is swung downwardly. This will serve to push plate 20 out of its way until shoulder 24 has passed by the top of said plate 20, when said plate, under tension of spring 25, will be swung back in place, its end coming right under shoulder 24. When the handle is in this position, it is held firmly in the socket until it will be necessary to remove it when, with the aid of lever 22, this may be done as indicated above.

It will be seen that some changes may be made in the construction of my handle and my socket without departing from the inventive principle disclosed therein. What I, therefore, claim is as follows:

1. In combination, a socket on a utensil and a removable handle fitting into said socket, said socket including a base abutting the side of the utensil, two elongated arms spaced from each other and extending at a right angle therefrom, each arm having a slot opening from above and extending horizontally in part, a horizontal bridge adjoining the arms between the base and the slots, a pivoted upright plate spaced from the base, a compression spring between the base and the pivoted plate, a lever integrally connected to the plate and extending upwardly out of the socket through an opening in the bridge, the above said handle including a shank to fit into the socket under said bridge and radially with respect to the utensil, the shank having a horizontal shoulder on the operative end thereof, to jut over the upper end of said pivoted plate, and a transverse pin on each side to fit into a respective slot, the end of the lever extending outwardly, serving as a means to swing the pivoted plate out of engagement with the shoulder on the shank of said handle.

2. In combination, a socket on a utensil, comprising a base, two spaced arms extending therefrom each provided with a slot opening from above and disposed horizontally in part, a transverse bridge adjoining the base and joining said arms, a pivoted upright plate between the arms and spaced from the base, a compression spring between the base and the plate, a handle provided with a shank to fit into the socket under said bridge, the shank having a transverse pin on each side to enter a respective slot, and a shoulder on its end to fit over the upper edge of the pivoted plate, and lever means extending outwardly from the socket, to swing the plate inwardly, against the tension of the spring, from under the shoulder on said shank.

WILLIAM T. HANKE.